United States Patent [19]

Mueller et al.

[11] Patent Number: 6,022,833

[45] Date of Patent: *Feb. 8, 2000

[54] MULTICOMPONENT MIXTURES FOR USE IN GEOLOGICAL EXPLORATION

[75] Inventors: Heinz Mueller, Monheim; Claus-Peter Herold, Mettmann; Thomas Foerster; Stephan von Tapavicza, both of Erkrath; Johann-Friedrich Fues, Grevenbroich; Marcus Claas, Hilden, all of Germany

[73] Assignee: Henkel Kommanditgesellschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,188

[22] Filed: Sep. 18, 1997

Related U.S. Application Data

[60] Provisional application No. 60/035,578, Jan. 16, 1997.

[51] Int. Cl.[7] .................................. C09K 3/00; C09K 7/00
[52] U.S. Cl. .................... 507/203; 507/211; 507/234; 507/244; 507/245; 507/260; 507/261; 507/265; 507/266; 507/268; 175/66
[58] Field of Search .................................. 507/103, 203, 507/136, 261, 211, 234, 245, 244, 260, 265, 266, 268; 175/66

[56] References Cited

U.S. PATENT DOCUMENTS

| | | | |
|---|---|---|---|
| 3,977,472 | 8/1976 | Graham et al. | 166/308 |
| 4,457,373 | 7/1984 | Balzer | 507/261 |
| 4,582,138 | 4/1986 | Balzer | 507/261 |
| 4,705,110 | 11/1987 | Balzer | 507/136 |
| 4,917,808 | 4/1990 | Balzer | 507/136 |
| 4,946,606 | 8/1990 | Osterloh | 507/261 |
| 4,971,707 | 11/1990 | Osterloh | 507/261 |
| 4,993,448 | 2/1991 | Karydas | 507/103 |
| 5,068,041 | 11/1991 | Patel et al. | 507/103 |
| 5,092,405 | 3/1992 | Prukop | 166/272 |
| 5,189,012 | 2/1993 | Patel et al. | 507/103 |
| 5,252,554 | 10/1993 | Mueller et al. | 507/138 |
| 5,254,531 | 10/1993 | Mueller et al. | 507/131 |
| 5,318,954 | 6/1994 | Mueller et al. | 507/138 |
| 5,318,955 | 6/1994 | Muller et al. | 507/139 |
| 5,401,425 | 3/1995 | Prukop | 507/261 |
| 5,403,822 | 4/1995 | Mueller et al. | 507/138 |
| 5,432,152 | 7/1995 | Dawson et al. | 507/103 |
| 5,441,927 | 8/1995 | Mueller et al. | 507/138 |

FOREIGN PATENT DOCUMENTS

| | | |
|---|---|---|
| 0386638 | 3/1930 | European Pat. Off. . |
| 0354586 | 8/1989 | European Pat. Off. . |
| 0374671 | 12/1989 | European Pat. Off. . |
| 0374672 | 12/1989 | European Pat. Off. . |
| 0382070 | 1/1990 | European Pat. Off. . |
| 0382071 | 1/1990 | European Pat. Off. . |
| 0386636 | 3/1990 | European Pat. Off. . |
| 0391251 | 3/1990 | European Pat. Off. . |
| 0391252 | 3/1990 | European Pat. Off. . |
| 0521981 | 10/1991 | European Pat. Off. . |
| 0512501 | 5/1992 | European Pat. Off. . |
| 0535074 | 4/1993 | European Pat. Off. . |
| 0627481 | 12/1994 | European Pat. Off. . |
| 2258258 | 7/1992 | United Kingdom . |
| 2309240 | 7/1997 | United Kingdom . |
| 91/15184 | 3/1991 | WIPO . |
| 91/18958 | 12/1991 | WIPO . |
| 91/19771 | 12/1991 | WIPO . |
| 94/14919 | 7/1994 | WIPO . |
| 94/28087 | 12/1994 | WIPO . |
| 95/30643 | 11/1995 | WIPO . |
| 95/32260 | 11/1995 | WIPO . |

OTHER PUBLICATIONS

Society of Petroleum Engineers of AIME, "New Base Oil Used in Low–Toxicity Oil Muds", (1985).
Society of Petroleum Engineers of AIME, "New Drilling Fluid Technology–Mineral Oil Mud", (1984).
Gulf Publishing Co., Composition and Properties of Oil Well Drilling Fluids, 4th edt. (No Date Available).
Intntl Journal of Cosmetic Science, "Calculation of Optimum Emulsifier Mixtures for Phase Inversion Emulsification", Foerster et al., (1994).
Encyclopedia of Emulsion Technology, vol. 1, Basic Theory, pp. 337–367, (1983).
Tergo Data, "Surfactants Eudropa", 2nd. edt., pp. 139–315, (No Date Available).
Lever Brothers Co, "Nonionic Surfactants", (1967).
Wissenschaftliche Verlagsgesellschaft MBH Struttgart, Grenzflächenaktive Äthylenoxid–Addukte, (1976).

*Primary Examiner*—Philip Tucker
*Attorney, Agent, or Firm*—Wayne C. Jaeschke; Real J. Grandmaison; Glenn E. J. Murphy

[57] ABSTRACT

The invention relates to flowable and pumpable multicomponent mixtures based on a multiphase mixture of water and oil containing emulsifiers and, if desired, other soluble, emulsifiable and/or dispersible auxiliaries for their use in exploration by drilling and/or for the further treatment of the wells thus drilled. The invention is characterized by the use of emulsifiers or emulsifier systems which, in the particular multicomponent mixture in question, lead to temperature-controlled phase inversion at a phase inversion temperature (PIT) in a temperature range of which the upper limit is so far below the working temperature of the multicomponent mixture in geological exploration that the water-based part of the multicomponent mixture is present as a disperse (invert) phase in the continuous oil phase (w/o invert emulsion) while the lower limit of this temperature range enables the multicomponent mixture to be converted into an o/w emulsion with a continuous aqueous phase. At least partly nonionic emulsifiers or emulsifier systems with a PIT of 0 to 100° C. are particularly suitable. The invention enables the requirements in regard to technical performance, ecological compatibility and cost/effectiveness ratio to be optimally satisfied.

20 Claims, No Drawings

MULTICOMPONENT MIXTURES FOR USE IN GEOLOGICAL EXPLORATION

CROSS-REFERENCE TO RELATED APPLICATIONS

This application claims priority from U.S. provisional application Serial No. 60/035,578 filed Jan. 16, 1997 and Germany Patent Application 196 43 840.3 filed Oct. 30, 1996.

BACKGROUND OF THE INVENTION

1. Field of the Invention

This invention relates to new free-flowing and pumpable fluids for use in geological exploration, more particularly well servicing fluids, which contain an oil phase and an aqueous phase using emulsifiers. As a characteristic example of servicing fluids of this type, the invention is described in the following with reference to drilling fluids and drilling muds based thereon. However, the modified auxiliary fluids according to the invention are by no means confined to this particular field of application. Related applications covered by the invention include, for example, spotting fluids, spacers, packer fluids, auxiliary fluids for workover and stimulation and for fracturing.

The use of the new multicomponent mixtures as free-flowing well servicing fluids is of particular importance for the development, particularly the offshore development, of oil and gas occurrences, but is by no means confined to this particular application. The new systems may also be generally used in land-supported drilling operations, for example in geothermal drilling, water drilling, geoscientific drilling and mine drilling.

2. Discussion of Related Art

It is known that drilling fluids for sinking wells in rock and bringing up the rock cuttings are flowable systems thickened to a limited extent which may be assigned to any of the following three classes:

Purely aqueous drilling fluids, oil-based drilling fluids, which are generally used in the form of so-called invert emulsion muds, and water-based o/w emulsions which contain a heterogeneous finely disperse oil phase in the continuous aqueous phase.

Drilling fluids with a continuous oil phase are generally formulated as three-phase systems: oil, water and fine-particle solids. The aqueous phase is heterogeneously and finely dispersed in the continuous oil phase. Several additives are used, including in particular emulsifiers, weighting additives, fluid loss additives, alkali reserves, viscosity regulators and the like. Relevant particulars can be found in the Article by P. A. Boyd et al. entitled "New Base Oil Used in Low-Toxicity Oil Muds" in Journal of Petroleum Technology, 1985, 137 to 142 and in the Article by R. B. Bennett entitled "New Drilling Fluid Technology—Mineral Oil Mud" in Journal of Petroleum Technology, 1984, 975 to 981 and the literature cited therein.

So far as performance properties are concerned, drilling fluids based on aqueous o/w emulsions occupy an intermediate position between purely aqueous systems and oil-based invert muds. Detailed relevant information can be found, for example, in the book by George R. Gray and H. C. H. Darley entitled "Composition and Properties of Oil Well Drilling Fluids", 4th Edition, 1980/81, Gulf Publishing Company, Houston and the extensive scientific and patent literature cited therein and in the manual entitled "Applied Drilling Engineering", Adam T. Borgoyne, Jr. et al., First Printing Society of Petroleum Engineers, Richardson, Tex. (U.S.A).

Even today, oil-based w/o invert systems are undoubtedly the safest fluids, particularly for drilling through water-sensitive clay layers. The continuous oil phase of the w/o invert emulsion forms a continuous semipermeable membrane on the surface of the drilled layers of rock and the cuttings introduced into the drilling fluid so that potential diffusions of water can be direction-controlled. The optimization of the working result achieved by using w/o invert fluids has never been matched by any other type of drilling fluid.

Drilling fluids of the type just mentioned and other well servicing fluids of comparable composition originally used mineral oil fractions as the oil phase. Considerable environmental pollution can thus be caused if, for example, the drilling muds enter the environment either directly or through the drilled rock. Mineral oils are not readily biodegradable and, anaerobically, are virtually non-degradable and, for this reason, may be regarded as long-term pollution. In the last decade in particular, various proposals have been put forward by experts with a view to replacing the mineral oil fractions by ecologically safer and more readily degradable oil phases. Applicants describe possible alternatives for the oil phase, including mixtures of such replacement oils, in a relatively large number of patents and patent applications. The documents in question describe in particular selected oleophilic monocarboxylic acid esters, polycarboxylic acid esters, at least substantially water-insoluble alcohols which flow freely under working conditions, corresponding ethers and selected carbonic acid esters, cf. EP 0 374 671, EP 0 374 672, EP 0 386 638, EP 0 386 636, EP 0 382 070, EP 0 382 071, EP 0 391 252, EP 0 391 251, EP 0 532 570, EP 0 535 074.

However, third parties have also put forward various proposals for alternative oil phases for the field of application in question. For example, the following classes of compounds have been proposed as a replacement for mineral oils in w/o invert muds: acetals, $\alpha$-olefins (LAO), poly-$\alpha$-olefins (PAO), internal olefins (IO), (oligo)amides, (oligo)imides and (oligo)ketones, cf. EP 0 512 501, EP 0 627 481, GB 2,258,258, U.S. Pat. No. 5,068,041, U.S. Pat. No. 5,189,012 and WO 95/30643 and WO 95/32260.

Today, various alternative oil phases for the field of application targeted by the invention are used in practice. Nevertheless, there is still a need for better balancing of the three key parameters for efficient technical procedure: optimized technological working result, optimized control of the ecological problem area and, finally, optimization of the cost/effectiveness ratio.

The Problem Addressed by the Invention and the Concept of its Technical Solution The problem addressed by the present invention in its broadest version was to provide a new concept which would enable the overall result to be optimized as required on the basis of the extensive technical knowledge which exists today in the field of application targeted by the present invention. High technical efficiency would be achievable in a reasonable cost/effectiveness ratio and, at the same time, current ecological requirements would be optimally satisfied. This concept is formulated as a broad working principle which, with the aid of expert knowledge, may be varied and thus optimally adapted to the particular application envisaged in numerous specific embodiments.

According to the invention, the technical solution for this broad concept lies in the combination of the following working elements:

The composition of the free-flowing and pumpable water- and oil-based multicomponent mixture ensures that, under the particular in-use conditions, particularly in endangered rock formations within the well, the w/o invert mud is formed with the disperse aqueous phase in the continuous oil phase.

Away from endangered rock formations and, above all, in the working up and elimination of cuttings covered with residues of fluid, phase reversal is possible to form a water-based o/w emulsion.

The following desirable working results can thus be obtained in combination.

In the working range and particularly in endangered rock formations, the fluid is present as a w/o invert emulsion which, in known manner, forms the required seal on the surface of the rock in the form of a semipermeable membrane. Optimal well stability can thus be achieved.

At the same time, however, the element of the invention of controlled phase reversal to an o/w emulsion with a continuous aqueous phase and a disperse oil phase, as explained hereinafter, makes the rock cuttings separated from the circulated drilling fluid easier to work up and eliminate, as known to the expert. At least the predominant part of the oil phase present in dispersed form can easily be rinsed off the cuttings either by separate washing or even simply by dumping in seawater in the case of offshore drilling, depending on the eco compatibility of the oil phase. The disperse oil phase floats at least partly in the washing liquid and can be removed or is accessible to simplified aerobic degradation at the surface of the seawater.

The teaching according to the invention puts this principle of phase inversion into practice by using a working parameter involved in the circulation of the drilling fluid, namely the temperature of the drilling fluid at the particular point of use. Inside the well, the temperatures increase rapidly with increasing depth. The heated drilling fluid containing the hot cuttings also leaves the well with considerably elevated temperatures. By controlling and adjusting predetermined phase reversal temperatures, the desired reversal of the w/o invert phase to the o/w emulsion phase can now be achieved outside the well. Particulars of this phase reversal can be found in the following. The parameter of the phase inversion temperature (PIT) selected in accordance with the invention and thus determined in advance in the particular drilling fluid ensures that the circulated drilling fluid is in the required state of a w/o invert emulsion during the drilling process.

Scientific Background to the Teaching According to the Invention

It is known that emulsifiers or emulsifier systems are used to homogenize immiscible oil/water phases by emulsification. The following general knowledge is relevant in this regard: emulsifiers are compounds which, in their molecular structure, link hydrophilic and lipophilic elements to one another. The choice and extent of the particular units in the emulsifier molecule or emulsifier system in question are often characterized by the HLB value which makes a statement about the hydrophilic/lipophilic balance.

Normally, the emulsifiers or emulsifier systems with—comparatively—strongly hydrophilic components lead to high HLB values and, in practice, generally to the water-based o/w emulsions with a disperse oil phase. Emulsifiers or emulsifier systems with—comparatively—strongly lipophilic components lead to comparatively low HLB values and hence to the w/o invert emulsion with a continuous oil phase and a disperse water phase.

However, this description is highly simplified:

The effect of the emulsifiers or emulsifier systems used can be influenced and hence altered by a number of accompanying factors in the mixture as a whole. In the context of the present invention, known parameters for these modifications include in particular the charging of the aqueous phase with soluble organic and/or inorganic components, for example water-soluble, more particularly polyhydric lower alcohols and/or oligomers thereof, soluble inorganic and/or organic salts, the quantity ratio of emulsifier/emulsifier system to the quantity of oil and, finally, constitutional coordination in the composition of the emulsifier/emulsifier system on the one hand and the molecular structure of the oil phase on the other hand.

A particularly significant parameter in the context of the teaching according to the invention for the specific emulsifier effect in regard to formation of the o/w or w/o emulsion can be the particular temperature of the multicomponent system. At least partly nonionic emulsifiers/emulsifier systems in particular show this effect of pronounced dependence on temperature in mixtures of oil and water phases insoluble in one another.

The above-mentioned system parameter of the phase inversion temperature (PIT) is thus crucially important. In cooperation with the other system parameters mentioned above, the emulsifiers/emulsifier systems used lead to the following emulsion associations:

System temperatures below the PIT form the o/w emulsion while system temperatures above the PIT form the w/o invert emulsion. The system is phase-inverted by shifting the temperature into the other temperature range.

The teaching according to the invention makes use of this and, hence, of the natural variation in this parameter:

In the hot interior of the well, the w/o invert state with a continuous oil phase is guaranteed through the choice of suitable emulsifiers/emulsifier systems in conjunction with the other variables to be taken into account here. In the comparatively cold outside environment, the drilling fluid can be phase-inverted simply by lowering the temperature below the PIT of the system, so that components to be removed are easier to work up. The heat effect which always accompanies the in-rock circulation of the drilling fluid ensures the required high temperature range above the PIT of the system at the hot rock surface and thus renders it neutral to the disperse water component of the drilling fluid in this region.

Before the details of the technical teaching according to the invention are discussed, important relevant literature and expert knowledge of the phenomenon of temperature-dependent phase inversion and the associated parameter of the phase inversion temperature (PIT) are summarized in the following. In the light of this basic knowledge available to the general public, the teaching according to the invention will readily be understood and can be put into practice.

A very detailed account of the phase equilibria of three-component systems of an aqueous phase/oil phase/surfactant (more particularly nonionic emulsifiers/emulsifier systems) can be found in the publication by K. SHINODA and H. KUNEIDA entitled "Phase Properties of Emulsions; PIT and HLB" in "Encyclopedia of Emulsion Technology", 1983, Vol. 1, 337 to 367. The authors also include above all the extensive relevant prior-art literature in their publication, knowledge of the dependence on temperature of the phase inversion of such emulsifier-containing oil/water systems being particularly important for understanding the teaching according to the invention as described in the following. The cited publication of SHINODA et al. discusses in detail this temperature parameter and the effects triggered by its variation in the multiphase system. Above all, however, reference is also made to earlier expert knowledge, cf. for example the earlier publications of K. SHINODA et al.—numbers 7 to 10 in the list of references (loc. cit., pages 366/367). Here SHINODA describes the parameter of the phase inversion temperature (PIT, HLB temperature), the dependence on temperature of the particular system using nonionic emulsifiers being given particular emphasis in the earlier publications of SHINODA et al.—numbers 7 and 8 in the list of references. Free-flowing mixtures based on the three-component systems of oil/water/emulsifier are discussed above all in regard to the dependence of the particular phase equilibrium states established upon the temperature of the multicomponent system. The o/w emulsion state with a disperse oil phase in the continuous water phase which is stable at comparatively low temperatures inverts when the temperature is increased to the phase inversion range (PIT or "middle phase" range). In the event of a further increase in temperature, the multicomponent system inverts to the stable w/o invert state in which the water phase is dispersed in the continuous oil phase.

In his list of references (loc. cit., references 31 and 32), SHINODA refers to earlier works of P. A. WINSOR. In the text of his previously cited publication (pages 344 to 345), the phase equilibrium codes coined by WINSOR, namely WINSOR I, WINSOR III and WINSOR II, are related to the temperature-dependent stable phases o/w—middle phase— w/o: WINSOR I is the stable water-based o/w phase, WINSOR II corresponds to the stable invert phase of the w/o type and WINSOR III denotes the middle phase and thus corresponds to the phase inversion temperature (PIT) range as it is now known both generally and in the context of the teaching according to the invention.

These various phases and, in particular, the (microemulsion) middle phase (WINSOR III) of the particular system may be determined in two ways which it is advisable to combine with one another:

a) Determination of the dependence on temperature and the associated phase displacement by experimental testing of the system, more particularly by conductivity measurement.

b) The PIT of the particular system in question can be calculated in advance on the basis of expert knowledge.

Basically, the following applies in this regard: the phenomenon of phase inversion and the associated phase inversion temperature (PIT) take place in a temperature range which is limited at its lower end with respect to the o/w emulsion state and, at its upper end, with respect to the w/o invert emulsion state. Experimental testing of the particular system, in particular by conductivity measurement at rising and/or falling temperatures, provides figures for the particular PIT lower limit and PIT upper limit—again with the possibility of slight displacements if the conductivity is measured on the one hand at rising temperatures and on the other hand at falling temperatures. To this extent, the phase inversion temperature (PIT) or, better stated, the PIT range agrees with the definition of the previously explained WINSOR III (microemulsion) middle phase, However:

The interval between the PIT lower limit (limitation with respect to o/w) and the PIT upper limit (limitation with respect to w/o invert) is generally a controllable temperature range which is comparatively limited through the choice of suitable emulsifier components or systems. In many cases, the temperature limits in question differ by less than 20 to 30° C. and, more particularly, by no more than 10 to 15° C. The teaching according to the invention can make use of this if the invert fluid—or separated components thereof—is to be clearly converted into the o/w emulsion state. However, for certain embodiments which will be described hereinafter, it can be of interest to use comparatively broad temperature ranges for phase inversion as long as it is ensured that, in the working temperature range in which the drilling fluid is used in the earth's interior, the upper limit of this PIT range (establishment of the w/o invert state) is not only reached, but preferably is comfortably exceeded.

By contrast, calculation of the PIT of the particular system in question according to b) does not lead to exact determination of the above-mentioned temperature limits of the particular PIT range, but instead to a figure lying in the order of magnitude of the PIT range actually occurring in practice. This explains why it can be advisable in practice to combine the phase shift determinations according to a) and b). The following observations apply in this regard:

The experimental conductivity measurement of the system shows optimal conductivity for the water-based o/w fluid, but generally no conductivity for the w/o invert phase. If the conductivity of an emulsion sample is measured at various temperatures (rising and/or falling) in the phase inversion temperature range, the temperature limits between the three ranges mentioned, o/w-middle phase-w/o, can be numerically determined very accurately. The following observations apply in regard to the conductivity or non-existent conductivity of the two limiting ranges: between these two ranges lies the phase inversion temperature range of the particular system of which the lower limit (conductive) and upper limit (non-conductive) can be exactly determined.

This experimental determination of the phase inversion temperature range by conductivity measurements is described in detail in the relevant prior art literature, cf. for example the disclosures of EP 0 354 586 and EP 0 521 981. The o/w emulsions cooled below the phase inversion temperature range were found to have an electrical conductivity of more than 1 mSiemens per cm (mS/cm). A conductivity graph is prepared by slow heating under predetermined program conditions. The temperature range in which conductivity falls to values below 0.1 mS/cm is recorded as the phase inversion temperature range. For the purposes of the teaching according to the invention, a corresponding conductivity graph is also prepared for falling temperatures. In this case, conductivity is determined using a multicomponent mixture which, initially, was heated to temperatures above the phase inversion temperature range and thereafter was cooled in a predetermined manner. The upper and lower limits thus determined for the phase inversion temperature range do not have to be identical with the corresponding values of the previously described determination section with rising temperatures of the multicomponent mixture. In general, however, the respective limits are so close to one another that standardized values can be used for industrial purposes (in particular by averaging the associated limits). However, the practicability of the technical teaching described in detail in the following is guaranteed from the working principles used here even for the case where significant differences in the limits of the phase inversion temperature range are measured on the one hand during determination at rising temperatures and on the other hand during determination at falling temperatures. The components of the multicomponent system have to be adapted to one another in their working parameters and effects in such a way that the working principle according to the invention as described in the foregoing can be put into practice: in the hot interior of the rock borehole, the w/o invert state with continuous oil phase is guaranteed. In the comparatively cold outside environment, the drilling mud can be phase-inverted by lowering the temperature below the PIT so that the components to be separated off are easier to work up.

To reduce the amount of work involved in the experiments, it can be useful to calculate the PIT of the particular multicomponent system. However, the same also applies in particular to potential optimizations in the choice of the emulsifiers or emulsifier systems and their adaptation to the selection and mixing of the aqueous phase on the one hand and the type of oil phase on the other hand in dependence upon other aspects of technical procedure. Relevant expert knowledge has been developed just recently from, basically, totally different fields, more particularly from the production of cosmetics. According to the present invention, this generally valid expert knowledge is now also being applied to the field of geological exploration and to the treatment of existing rock bores with systems containing optimized oil and water phases.

Particular reference is made in this connection to the Article by T H. FÖRSTER, W. VON RYBINSKI, H. TESMANN and A. WADLE "Calculation of Optimum Emulsifier Mixtures for Phase Inversion Emulsification" in International Journal of Cosmetic Science 16, 84–92 (1994). The Article in question contains a detailed account of how the phase inversion temperature (PIT) range of a given three-component system of an oil phase, a water phase and an emulsifier can be calculated by the CAPICO method (calculation of phase inversion in concentrates) on the basis of the EACN value (equivalent alkane carbon number) characteristic of the oil phase. More particularly, this Article by FÖRSTER et al. cites important literature for the field targeted by the invention, cf. pages 91 and 92 loc. cit. in conjunction with the actual disclosure of the Article. With the aid of numerous examples, it is shown how the choice and optimization of the emulsifiers/emulsifier systems are accessible to the adjustment of optimal predetermined values for the phase inversion temperature range by the CAPICO method in conjunction with the EACN concept.

On the basis of this fundamental knowledge, mixtures of which the PIT is within the range according to the invention and corresponding mixing ratios can be determined in advance for the components intended for practical use, more particularly the oil phase and associated emulsifiers/emulsifier systems (type and quantity). A first useful basis for carrying out experiments on the lines of method a) is thus established. Over and above calculation of the PIT, it is possible in particular to determine the lower and, above all, upper limits of the range in which the middle phase is formed. The temperature limits above which lies the w/o invert range for the drilling mud in direct contact with the hot inner wall of the well for formation of the continuous semipermeable membrane are thus clearly laid down. In general, it is advisable in practice (see the following explanations of the teaching according to the invention) to select and guarantee this upper limit of the phase inversion temperature range with an adequate safety margin in order to ensure the w/o invert phase required in the hot region.

On the other hand, the temperature should be able at lower values to fall below the w/o invert limit to such an extent that use can be made of the advantages of phase reversal up to the o/w phase and the easier working up of the separated components of the drilling mud to which this generally leads.

To complete the review of relevant expert knowledge, reference is made to the following: in recent years, considerable efforts have been made by researchers to improve so-called enhanced oil recovery by flooding oil-containing rock layers with o/w emulsions containing emulsifiers/emulsifier systems. The goal has been in particular to use corresponding systems for the middle emulsion phase (WINSOR III) within the formation. This will immediately become clear from the opposing objective deviating from the teaching according to the invention: optimization of the o/w-w/o equilibrium to form the microemulsion phase in the multicomponent system leads to an increase in the effectiveness of the washing process required in flooding and hence to an increase in the washing out of the oil phase from the rock formation. It is crucially significant in this regard that, by virtue of the microemulsion state, the unwanted blockage of pores in the rock by relatively large oil droplets can be safely prevented.

The objective of the invention is the opposite of this step of enhanced oil recovery by flooding:

The object of the teaching according to the invention in using w/o invert emulsions is to seal the porous surface of rock formations in the well by the continuous oil layer. At the same time, however, the invention seeks to achieve easier disposal of the drilling mud or rather components thereof by phase inversion outside the well.

DESCRIPTION OF THE INVENTION

In a first embodiment, therefore, the present invention relates to a flowable and pumpable multicomponent mixture based on a multiphase mixture of water and oil containing emulsifiers and, if desired, other soluble, emulsifiable and/or dispersible auxiliaries for its use in exploration by drilling and/or for the further treatment of the wells thus drilled.

This embodiment of the invention is characterized by the use of emulsifiers or emulsifier systems which, in the particular multicomponent mixture in question, lead to temperature-controlled phase inversion at a phase inversion temperature (PIT) in a temperature range of which the upper limit is so far below the working temperature of the multicomponent mixture in geological exploration that the water-based part of the multicomponent mixture is present as a disperse (invert) phase in the continuous oil phase (w/o invert emulsion) while the lower limit of this temperature range enables the multicomponent mixture to be converted into an o/w emulsion with a continuous aqueous phase.

The PIT of the multicomponent mixture preferably lies in a temperature range above the solidification point of its aqueous phase as the lower limit and, in particular, in the range up to 100° C. as the upper limit. Other preferred multicomponent mixtures are flowable and pumpable at temperatures as low as room temperature.

In one particularly important embodiment, the invention relates to the use of such multicomponent systems in w/o invert drilling fluids (drilling muds) of the type used in geological exploration for the purpose of limiting the necessary quantity of oil phase while at the same time ensuring w/o invert emulsification, for neutralizing the water-containing drilling fluid in direct contact with the walls of the well and the rock cuttings at high temperatures and for the purpose of facilitating the disposal of the cuttings covered with drilling mud by phase inversion of the mud at low temperatures.

In another important embodiment, the present invention relates to the use of emulsifiers or emulsifier systems with a temperature-controlled phase inversion (PIT), more particularly in the range from 0 to 100° C., for the temperature-dependent formation of o/w and w/o emulsions from water- and oil-based liquid phases in the production and use of flowable and pumpable emulsions optionally charged with fine-particle solids, more particularly drilling fluids, for the drilling of rock and/or for the further treatment of correspondingly drilled wells. Water-based o/w emulsification can be determined in advance and adjusted to temperatures below the PIT while formation of the w/o invert emulsion can be determined in advance and adjusted at temperatures above the PIT. Emulsifiers or emulsifier systems particularly suitable for this purpose are those which are at least partly and, preferably, at least predominantly nonionic in structure and/or which link both nonionic structural elements and anionic structural elements to one another in the basic molecular structure of the emulsifiers/emulsifier systems.

DETAILED DESCRIPTION OF THE INVENTION

Although implementation of the working principle according to the invention is not confined to the use of nonionic emulsifiers or emulsifier systems, the general and preferred embodiments of the teaching according to the invention discussed in the following are described above all with reference to the use of nonionic emulsifiers/emulsifier systems. Nonionic emulsifiers/emulsifier systems are also particularly suitable for the practical implementation of the principle according to the invention. The influence of salts in the aqueous phase, more particularly salts of polyvalent cations, on the emulsifying effect of nonionic emulsifiers is comparatively weak. However, the use of such salt-containing aqueous phases in the invert drilling fluid can be of practical importance for regulating the equilibrium of the osmotic pressures between the drilling fluid on the one hand and the liquid phase in the surrounding rock on the other hand. Nonionic emulsifiers/emulsifier systems can be used as flowable components for preferred embodiments of the teaching according to the invention, even at room temperature or slightly elevated temperatures. The range of suitable nonionic emulsifiers is so broad and available from chemicals of both natural and synthetic origin that ecologically compatible and, in particular, aquatoxicologically optimized emulsifier systems can be used. At the same time, the key components are inexpensively obtainable. However, the main reason why nonionic emulsifier components are preferably used in accordance with the invention lies in the pronounced temperature dependence on the PIT in the particular oil system which can be additionally controlled through the quantity ratios of the oil phase to the emulsifiers/emulsifier components in the mixture (cf. the above-cited article by Förster et al.).

In preferred embodiments of the teaching according to the invention, the emulsifiers/emulsifier systems are adapted to the various other parameters involved in the composition of the drilling fluid in such a way that the PIT of the multicomponent mixture lies in a temperature range which defines the solidification of the aqueous phase of the multicomponent mixture as its lower limit. As already briefly discussed, drilling fluids of the type in question normally contain an aqueous phase which itself may contain considerable quantities of dissolved organic and/or inorganic auxiliaries, for example soluble salts for adjusting and regulating the pressure equalization of the water phases competing with one another and their osmotic pressures on the one hand in the surrounding rock of the well and on the other hand in the drilling fluid. The solidification temperatures of these aqueous phases, for example salt-containing aqueous phases, can be distinctly below 0° C., for example in the range from –10 to –20° C. However, a preferred lower limit for the PIT or the PIT range of the multicomponent mixture is about 0° C. so that preferred values for the lower limit of the PIT are corresponding values above 0 to 5° C. and, more particularly, values in the range from 10 to 15° C. or even 20° C. The practical significance of these comparatively low limits for the determination of the PIT range at its lower end is discussed in the following in conjunction with preferred embodiments of the teaching according to the invention.

The following general and preferred observations apply to the determination of the upper limit to be imposed in accordance with the invention on the temperature range in which phase inversion takes place on cooling:

The upper limit to the temperature range in which phase inversion is initiated should be sufficiently remote from the stable w/o invert emulsion range. Accordingly, it is advisable for the upper limit to the phase inversion temperature range to be at least 3° C. to 5° C. below the working temperature of the multicomponent mixture in geological exploration. However, the intervals between these two temperature parameters are preferably more pronounced. Thus, in preferred embodiments, the intervals between the two temperature parameters in question is preferably at least 10° C. to 15° C. and, more preferably, at least 20° C. to 30° C. This does not give rise to any particular difficulties in practice because temperatures of 100° C. and higher are of course reached comparatively quickly in the hot rock.

Accordingly, it is generally preferred to put the upper limit for the definition and determination of the PIT or PIT range in the context of the teaching according to the invention at a maximum of 100° C. or only slightly higher, for example at a maximum of 110 to 120° C. In preferred embodiments, the upper limit for the choice and adjustment of the PIT is at temperatures below 100° C., for example at a maximum of about 80 to 90° C., preferably at a maximum of 60° C. and more preferably at a maximum of 50° C. It follows from this that multicomponent mixtures of the described type which have a PIT in the range from about 5 to 80° C., preferably in the range from about 10 to 60° C. and more preferably in the range from 15 to 50° C. can be of particular advantage for the teaching according to the invention. In one particularly preferred embodiment of the invention, the PIT may be in the range from 20 to 35° C. or even up to 40° C. This is illustrated by the following considerations:

In the practical application of multicomponent mixtures according to the invention, for example as a flowable and pumpable drilling fluid in geological exploration, the drilling fluid is continuously circulated downwards into the rock and then—charged with the rock cuttings—back up again to the drilling platform. The rock cuttings are removed, normally by sieving, on the drilling platform and the flowable and pumpable liquid phase recovered is pumped into a storage tank from which the invert mud is repumped downwards into the well. In the course of its circulation, the drilling fluid passes through a considerable temperature gradient, even if the fluid and rock cuttings are pumped upwards while still hot. The technical stages involved in the sieving and storage of the drilling fluid in the storage tank generally lead to a reduction in the temperature of the fluid, for example to a value of about 40 to 60° C.

By adapting the phase inversion or rather the PIT to these parameters, the teaching according to the invention provides for a preferred embodiment in which the circulated drilling fluid does not undergo phase inversion, even in the comparatively cooler regions outside the well. If the PIT (or PIT range) of the system is set and maintained at a predetermined limit, for example of 50° C., this objective can be achieved with simple means. Even at cold times of the year, corresponding lower limits for the temperature of the pump-circulated invert mud phase can be maintained in the circuit, for example by corresponding heating elements in the storage tank. However, the advantages of the teaching according to the invention now come into play for the working up and disposal of the cuttings separated from the fluid: by further reduction, the temperature reaches and, if desired, passes the lower limit of the PIT range, so that first the microemulsion middle phase and then, as the temperature is further reduced, the water-based o/w emulsion phase are established in those parts of the drilling fluid adhering to the cuttings. It can immediately be seen that disposal of the residual oil adhering to the cuttings can thus be substantially simplified.

For example, in the field of drilling muds for land-supported and/or preferably offshore exploration, it can be advisable to use drilling muds with a PIT of or below 50° C., for example with a PIT in the range from 20 to 35° C. The drilling fluid can thus be circulated without phase reversal and, hence, continuously as a w/o invert mud However, the cuttings separated off can now be cleaned more easily, above all in situ, or may even be disposed of by direct dumping. The optimum embodiment for this disposal step can be determined on the basis of general expert knowledge. The following observations are made purely by way of example.

If the cuttings covered with drilling fluids formulated in accordance with the invention are dumped directly into the surrounding seawater in offshore drilling, the temperature-controlled inversion phase (middle emulsion phase) and then the o/w emulsion phase are rapidly established in these fluid residues by cooling in the seawater. The diluting effect of the surrounding seawater can develop its full effect so that the oil droplets formed no longer adhere to the rock and are thus free to move. At least some of the oil droplets float upwards in the seawater where they encounter comparatively high concentrations of oxygen in the aqueous phase and undergo aerobic degradation comparatively easily.

However, the cuttings to be disposed of can also be at least partly freed from the oil phase in a separate working step preferably carried out in situ: at the temperature adjusted for the middle inversion phase, the oil phase is particularly easy to wash out, as required in the prior art for enhanced oil recovery, so that a corresponding washing process can be carried out without undue effort using water-based washing liquids, for example quite simply seawater. If the temperature is further reduced, an o/w emulsion is formed. The drilling fluid can thus readily be separated up into the aqueous phase and the oil phase in a potential step of such a cleaning process.

Taking this consideration into account, it will readily be appreciated that preferred drilling muds for land-supported and/or preferably for offshore geological exploration, more particularly for the development of oil and/or gas occurrences, can be formulated in such a way that they have a PIT of or below 50° C., preferably of or below 40° C. and, more particularly, in the range from 20 to 35° C. The PIT of the system as a whole may be adapted in particular to the conditions under which the drilling mud is used so that the cuttings covered with drilling mud can be cleaned after removal from the drilling mud by washing with cold water, more particularly with seawater, and preferably with inversion from the w/o to the o/w phase.

The high flexibility of the teaching according to the invention in regard to the composition of the oil phase to be used in specific cases will readily be appreciated above all from these considerations. Even stringent requirements as to the ecological compatibility of the process in regard to the cuttings to be disposed of can be satisfied in w/o invert systems by oil phases which, hitherto, could no longer be used on account of their ecological incompatibility and, above all, their inadequate degradability by natural degradation processes under anaerobic conditions. Totally new possibilities are thus opened up for the optimization of the three main parameters (technical perfecting and complete ecological compatibility for a reasonable cost:effectiveness ratio) which the invention seeks to achieve: by virtue of the above-described possibilities for the automatic cleaning and freeing of the cuttings from adhering oil, a relatively large supply of oil phase to be degraded is no longer built up by dumping on the seabed in offshore disposal. Natural aerobic degradation processes in the oxygen-rich zone of the sea surface are activated. At least most of the oil can be removed from the cuttings before they are dumped by simple preliminary washing with a liquid based on cold water.

It can thus be seen that the entire hitherto known broad range of potential oil phases opens up for the teaching according to the invention. Thus, oil phases or mixed oil phases belonging at least partly and preferably at least predominantly to the following classes of oils are suitable for the teaching according to the invention:

Saturated hydrocarbons (linear, branched and/or cyclic), olefinically unsaturated hydrocarbons, more particularly of the LAO type (linear α-olefins), the IO type (internal olefins) and/or the PAO type (polymeric α-olefins), aromatic hydrocarbons, naphthenes, carboxylic acid esters, ethers, acetals, carbonic acid esters, fatty alcohols, silicone oils, (oligo)amides, (oligo)imides and/or (oligo)ketones.

The carboxylic acid esters previously mentioned in this regard include, on the one hand, corresponding esters of monocarboxylic acids and/or polycarboxylic acids and, on the other hand, corresponding esters of monohydric alcohols and/or polyhydric alcohols. Reference is again specifically made in this connection to the above-cited publications on the use of corresponding ester phases in the field in question which go back to work done by applicants. Over and above the disclosures of these literature references, however, the following discoveries have been made for the variant according to the invention:

In embodiments according to the invention of the multi-component mixtures in question here and, in particular, correspondingly formulated drilling fluids, esters of polyhydric alcohols with monocarboxylic acids and, in particular, glycerol esters of natural and/or synthetic origin may be effectively used for the first time as the oil phase or as part of the oil phase. In relevant prior art publications, it has been alleged for many years that oils of natural origin and, hence, corresponding glycerol-based triesters of higher unsaturated fatty acids can be used as an ecologically safe oil phase in w/o invert muds. In applicants' above-cited publications on the subject of ester-based drilling fluids, it is shown that these assertions in the prior art literature are purely theoretical and do not apply in practice. Surprisingly, it has been found using the systems according to the invention defined in detail hereinafter that triglycerides of natural and/or synthetic origin may be used as or in the oil phase of the drilling fluids. For example, it is possible to use triglycerides of vegetable and/or animal origin (for example of the rapeseed oil or fish oil type) which can be of considerable interest both ecologically and in regard to the cost:effectiveness ratio. The modifications to the composition of the drilling fluids involved in the technical realization of the concept according to the invention (possible choice of the preferred emulsifiers according to type and quantity) evidently create such modified basic conditions that the long-desired technical use of such oil phases, particularly of natural origin, is really made possible for the first time.

In terms of their chemical structure, therefore, any oil phases which enable the physical parameters required for the present technology to be established are basically suitable. These parameters will be discussed hereinafter. The aspects of optimized ecological compatibility naturally remains an important aspect so far as the choice of the oil phase is concerned, although it is no longer as important as before—even taking legislation into account. The use of temperature-controlled phase inversion provides for the ecologically safe disposal of that part of the drilling fluid which, hitherto, has presented the most difficulties in the handling of w/o-inert-based drilling fluids.

Over and above this elimination of existing difficulties, however, the teaching according to the invention also enables environmental protection to be achieved to a hitherto unknown level. By selecting environmentally particularly safe oil phases for the invert drilling fluid and by virtue of the possibility afforded by the invention of minimizing the problems of the degradation process, a hitherto unknown overall working result can be achieved in the direction of the objective of the invention. It is particularly important in this connection to take into account the known possibility now used with particular advantage in accordance with the invention of employing selected mixtures of different oils as the oil phase of the drilling fluid. Thus, it is possible to use mixtures of, on the one hand, anaerobically and/or aerobically non-readily degradable oils and, on the other hand, anaerobically and/or aerobically readily degradable oils which, in the form of cutting disposal optimized in accordance with the invention, represent an important step towards achieving the goal of total optimization according to the invention.

In this connection, another possibility for modifying the technology of w/o invert systems in question here will first be discussed. Here, too, there are significant advances to be achieved over the relevant prior art:

At present, conventional w/o invert systems and, more particularly, corresponding invert drilling fluids contain the oil phase in a quantity of at least 50% by volume, based on the ratio by volume of oil phase to water phase. The oil phase content is normally significantly higher, for example of the order of 70 to 90% by volume of the oil/water mixture. Although the relevant literature also mentions low-oil invert fluids, these comparatively low-oil mixtures play no part in practice, particularly in systems with the adequate ecological compatibility now demanded.

It was pointed out at the beginning that the phase inversion temperature range is determined inter alia by the quantity ratio of oil phase to emulsifier/emulsifier system, more particularly nonionic emulsifier/emulsifier system. Now, the larger the quantity of emulsifier/emulsifier system (based on the quantity of oil phase) used, the further generally the temperature range for adjusting the PIT will be lowered. At the same time, however, the stability of the w/o invert emulsion in practice will be increased so drastically that the range of useful quantity ratios in the particular oil/water mixture is significantly broadened. Quantity ratios (parts by volume) of water-based phase (W) to oil phase (oil) in the following ranges will thus become accessible for building up the multiphase and, preferably, pumpable mixtures: 90 to 10 W:10 to 90 oil. Mixing ratios of 85 to 20 W:15 to 80 oil can be particularly preferred. Taking into account the emulsifiers/emulsifier systems defined in the following, it will readily be possible to use w/o oil mixtures which contain the W phase in quantities of at least 30 to 40 parts by volume or even at least 50 parts by volume, for example in quantities of 55 to 85 parts by volume. The oil phase can thus even become quantitatively the minor component which, for example in a quantity of at least 10 to 15 parts by volume and preferably 20 to 50 parts by volume (based on the sum of the W and oil) guarantees stable w/o invert conditions at the temperatures prevailing in the rock. In this case, preferred multicomponent mixtures according to the invention are those of which the water-based phase makes up from 30 to 35% or more, preferably 40% or more and, more preferably, 50% or more (% by volume, based on the W/oil mixture). Mixtures with a predominant water phase can be of particular significance, quantities of up to 85% by volume and, more particularly, 55 or 60 to 80% by volume of the water-based phase being particularly preferred. Accordingly, the invention also encompasses w/o invert drilling fluids with a greatly reduced oil phase content which should make up no more than 20 to 40% by volume, based on the liquid phases, but at the same time satisfies the stated requirements in practice. The fact that disposal is again made considerably easier will be immediately apparent.

Extensive textbook knowledge and other relevant material is available on the chemical characteristics of emulsifiers, particularly nonionic emulsifiers, which are capable of temperature-controlled phase inversion and the characteristics of emulsifier systems containing corresponding nonionic components. Even the above-cited article by SHINODA et al. in Encyclopedia of Emulsion Technology, 1983, Vol. 1. 337 to 367 lists more than 100 special representatives of emulsifiers of which most may be classed as nonionic emulsifiers. In the relevant Table (Table 4 loc. cit.), the particular chemical component is accompanied by its HLB number. The Table encompasses in particular the number range from 1 to 20. The relevant prior art literature is also represented by the Article by Gordon L. Hollis in Surfacants Europa, Third Edition, The Royal Society of Chemistry, more particularly Chapter 4, Nonionics (pages 139 to 317). In addition, the unusually extensive relevant literature is also represented, for example, by the following publications which have appeared in book form: M. J. Schick "NONIONIC SURFACTANTS", Marcel Dekker, INC., New York, 1967; H. W. Stache "ANIONIC SURFACTANTS", Marcel Dekker, INC., New York, Basel, Hongkong; Dr. N. Schönfeldt "Grenzflächenaktive Ethyleneoxid-Addukte", Wissenschaftliche Verlagsgesellschaft mbH, Stuttgart 1976.

From this extensive knowledge of at least partly nonionic emulsifiers or emulsifier systems, it is possible on the basis of the expert knowledge likewise cited at the beginning (SHINODA et al. and Th. Förster et al.) to calculate the phase inversion temperature range for given mixtures of oil phase, emulsifier or emulsifier mixtures and aqueous phase. Accordingly, a few additional determining elements preferably applied in accordance with the invention to the choice of the emulsifier or emulsifier systems are discussed in the following.

It has proved to be helpful to use multicomponent emulsifier systems for controlling and adapting the required phase inversion temperature (PIT) range to the particular mixture of the multicomponent system, more particularly taking into account the choice of the oil phase in regard to type and quantity and the level of soluble components in the aqueous phase. Mixtures containing at least one principal emulsifier component together with co-emulsifiers can be advantageous. Another preferred embodiment contains principal emulsifier components which, in addition to being suitable for temperature-controlled phase inversion, have relatively high HLB values. Components with corresponding HLB values in the range from about 6 to 20 and preferably in the range from 7 to 18 have proved to be suitable principal nonionic emulsifier components. These principal components are preferably used together with relatively highly lipophilic co-emulsifiers which in turn have relatively low HLB values compared with the particular principal emulsifier component(s). Accordingly, useful co-emulsifiers fall first and foremost in the HLB range below the range mentioned above for the principal emulsifier component(s). Suitable co-emulsifiers may also fall within this HLB range, although they generally have lower values than the principal emulsifier component(s) present in admixture with their individual HLB values.

The following variant has proved to be particularly interesting for putting the teaching according to the invention into practice. In one important embodiment of the teaching according to the invention, the w/o emulsifiers used in practice today, particularly in oil-based invert drilling fluids, are capable of performing the function of the relatively highly lipophilic co-emulsifier in the emulsifier mixtures according to the present invention. The fact that this variant of the teaching according to the invention may be of particular interest can immediately be seen. Existing expert knowledge on the composition of oil-based w/o invert emulsions or corresponding drilling muds may largely be retained. The teaching according to the invention is implemented simply by adding one or more other emulsifier components of the type defined above which are capable of temperature-controlled phase inversion in the w/o invert system. The modification of tried and tested multicomponent systems of the type in question to meet the requirements of the teaching according to the invention can thus be considerably simplified. Thus, conventional drilling fluids, even if they are already in use, can be converted into PIT systems according to the invention by addition of the described co-emulsifiers.

The following factors can assume particular significance for implementing the teaching according to the invention:

Suitable oil phases include compounds which, at the same time, have a pronounced co-emulsifier effect in the combination of emulsifier system and oil phase. A classic example of such compounds are lipophilic fatty alcohols of natural and/or synthetic origin. Given adequate flow properties under in-use conditions, they can be a valuable part of the oil phase or can even form the oil phase as a whole. At the same time, they influence the relatively highly hydrophilic principal emulsifier components added by providing the required reduction in the PIT range. Alcohols of this type are known to be ecologically safe components. They are both aerobically and anaerobically degradable. Mixtures thereof with other oil components, more particularly oil components which do not have the same ready degradability, provide valuable results in promoting the overall optimization sought by the invention. However, other oil phases known from the literature, which are predominantly lipophilic with built-in groups of high polarity, are also capable of developing a corresponding co-emulsifier effect. The (oligo) amides, (oligo)imides and (oligo)ketones are mentioned as examples of such oil phases.

From the broad range of nonionic emulsifiers, particularly suitable principal emulsifier components and/or co-emulsifiers may be assigned in accordance with the invention to at least one of the following classes:

(Oligo)alkoxylates—more particularly low alkoxylates among which corresponding ethoxylates and/or propoxylates are particularly important—of basic molecules of natural and/or synthetic origin which contain lipophilic residues and which are capable of alkoxylation. The length of the alkoxylate groups in relation to the lipophilic groups present in the molecule determine the particular mixing ratio of hydrophilic to hydrophobic behavior in known manner and the associated assignment of the HLB values. Alkoxylates of the type mentioned are known to be nonionic emulsifiers as such, i.e. with a free terminal hydroxyl group at the alkoxylate residue, although the corresponding compounds may also be end-capped, for example by esterification and/or etherification.

Another important class of nonionic emulsifiers for the purposes of the invention are partial esters and/or partial ethers of polyhydric alcohols containing in particular 2 to 6 carbon atoms and 2 to 6 OH groups and/or oligomers thereof with acids and/or alcohols containing lipophilic residues. Particularly suitable compounds of this type are those which additionally contain (oligo)alkoxy groups and, in particular, corresponding oligoethoxy groups incorporated in their molecular structure. The polyfunctional alcohols containing 2 to 6 OH groups in the basic molecule and the oligomers derived therefrom may be, in particular, diols and/or triols or oligomerization products thereof, particular significance being attributed to glycol and glycerol or oligomers thereof. However, other polyhydric alcohols of the type collectively mentioned here, such as trimethylol propane, pentaerythritol and so on up to glycosides or their respective oligomers may also be basic molecules for the reaction with acids and/or alcohols containing lipophilic groups which are thus important emulsifier components in the context of the invention. Partial ethers of polyhydric alcohols also include known nonionic emulsifiers of the ethylene oxide/propylene oxide/butylene oxide block polymer type.

Further examples of corresponding emulsifier components are alkyl (poly)glycosides of long-chain alcohols, the fatty alcohols of natural and/or synthetic origin already mentioned and alkylol amides, amine oxides and lecithins. The presence of commercial alkyl (poly)glycoside compounds (APG compounds) as emulsifier components in the context of the invention can be of particular interest inter alia because emulsifiers belonging to this class show pronounced ecological compatibility. Other principal emulsifier components, for example nonionic surfactant compounds with fairly pronounced phase inversion behavior may also be partly used, for example for controlling phase inversion into the temperature ranges defined in accordance with the invention. These other principal emulsifier components may be selected, for example, from the oligoalkoxylate compounds which have already been repeatedly mentioned, more particularly from corresponding compounds of the oligoethoxylate type. However, this variation of the improved controllability of phase inversion behavior can also be obtained by corresponding oligoalkoxyation of the APG components themselves. However, by suitably selecting the type and quantity of APG components as principal emulsifier and co-emulsifiers, for example conventional w/o invert emulsifiers, the requirements according to the invention can again be satisfied without any other emulsifying auxiliaries.

Without any claim to completeness, the following representatives from the classes of suitable emulsifier components listed herein are additionally named: the (oligo) alkoxylates of basic molecules containing lipophilic groups may be derived in particular from selected representatives from the following classes of basic molecules containing lipophilic groups: fatty alcohols, fatty acids, fatty amines, fatty amides, fatty acid and/or fatty alcohol esters and/or ethers, alkanolamides, alkylphenols and/or reaction products thereof with formaldehyde and other reaction products of carrier molecules containing lipophilic groups with lower alkoxides. As already mentioned, the particular reaction products may also be at least partly end-capped. Examples of partial esters and/or partial ethers of polyhydric alcohols are, in particular, the corresponding partial esters with fatty acids, for example of the glycerol monoester and/or diester type, glycol monoesters, corresponding partial esters of oligomerized polyhydric alcohols: sorbitan partial esters and the like and corresponding compounds containing ether groups. The extensive expert knowledge available may be applied in this regard. The partial esters and/or ethers in question may also be basic molecules for an (oligo) alkoxylation reaction.

As mentioned above, a key determining element for the teaching according to the invention is that the quantity of emulsifier/emulsifier systems used in the multicomponent mixture is adapted to the percentage content of oil phase therein. Accordingly, preferred quantities of emulsifier are of the order of 1% by weight or larger and preferably in the range from 5 to 60% by weight, based on the oil phase. In practical terms, the following quantity ranges have proved to be particularly suitable for the emulsifiers/emulsifier systems used in accordance with the invention (based on the oil phase): 10 to 50% by weight, preferably 15 to 40% by weight and more preferably 20 to 35% by weight. Accordingly, the quantities of emulsifier are comparatively large by comparison with conventional w/o invert emulsion systems of the type used in the field targeted by the present invention. However, this is not necessarily a disadvantage. On the one hand, the necessary quantity of oil in the water/oil mixture can be greatly reduced in this way in relation to present levels without having to accept any disadvantages. On the other hand, the situation discussed in the foregoing has to be taken into consideration, i.e. selected oil phases, for example fatty alcohols, can perform a dual function and, accordingly, are both the oil phase and at the same time a co-emulsifier in the system formulated in accordance with the invention. It can be seen that totally new principles for system and process optimization in the sense of the problem addressed by the present invention can be derived from this aspect, too.

In addition to the foregoing observations, the following additional comments apply to the choice of the oil phases. The initially emulsifier-free oil phase should be at least predominantly insoluble in the aqueous emulsion phase and should preferably be flowable and pumpable even at room temperature. Flash points of the oil phases above 50 to 60° C., preferably in the range from 80 to 100° C. or higher and more preferably of the order of 120° C. or higher are desirable and preferred. It can also be of advantage to use oil phases which have a Brookfield (RVT) viscosity at 0 to 10° C. of not more than 55 mPas and preferably not more than 45 mPas, cf. the cited relevant literature on modern w/o invert emulsions and, in particular, the disclosures of applicants' above-cited European patents and patent applications which are hereby specifically incorporated by reference as part of the disclosure of the present invention.

The same also applies to the mixtures of aqueous phase, oil phase, emulsifiers and typical additives formulated as a drilling mud. In one particular embodiment, the mixture formulated as a drilling mud has a plastic viscosity (PV) of not more than 100 mPas at a temperature 10 to 15° C. above the limit between the middle emulsion phase and the w/o invert range. Preferred drilling muds are corresponding drilling muds which have a PV of not more than 80 mPas and, more particularly, in the range from 30 to 45 mPas. The yield point (YP) of drilling muds formulated in accordance with the invention should be no greater than 80 lb/100 ft$^2$ at a temperature 10 to 15° C. above the limit between the middle emulsion phase and the w/o invert range. The preferred yield point is no greater than 50 lb/ft$^2$ and, more particularly, is above 4 to 5 lb/ft$^2$, for example in the range from 10 to 25 lb/ft$^2$.

The appropriate overall composition of the free-flowing auxiliary used to implement the teaching according to the invention is also determined by modern practical requirements. In this regard, too, reference may be made to the extensive prior art literature cited in the description of the invention, particularly in regard to the w/o invert fluids. Accordingly, corresponding mixtures according to the invention, for example as drilling muds, additionally contain auxiliaries typically used in this field, such as thickeners, fluid loss additives, fine-particle weighting materials, salts, optionally alkali reserves and/or biocides. Further particulars, which are also applicable to the formulation of drilling fluids in accordance with the invention, can be found for example in EP 374 672. The use of water-soluble methyl glycoside compounds in the aqueous phase also falls within the scope of the invention, cf. for example PCT WO 94/14919.

A particular feature will now be discussed in this regard. Although based on expert knowledge of the specialist field in question, this feature has not generally been instrumental in the composition of known w/o invert drilling fluids:

It is known that water-based emulsion muds and, in particular, drilling fluids of the o/w type can be stabilized against the unwanted sedimentation of dispersed solids, even at comparatively low temperatures, by the presence of water-soluble polymer compounds. In principle, water-soluble polymer compounds of both natural and synthetic origin are suitable for this purpose. Relevant expert knowledge may be applied in this regard.

According to the invention, the drilling fluid as a whole may also be cooled outside the point of use to such an extent that it undergoes phase inversion to an o/w emulsion. The relevant rules thus apply in regard to adequate stabilization of the system so that, in particular, the use of the stabilizing water-soluble polymer compounds in question and/or even water-swellable clays may be considered. Their presence in the w/o invert phase in the hot working zone is not a problem.

Detailed information on the composition of drilling fluids of the type targeted by the invention and, more particularly, water-based or oil-based drilling fluids and the auxiliaries used in practice in this connection can be found, for example, in the above-cited book by George R. Gray and H. C. H Darley entitled "Composition and Properties of Oil Well Drilling Fluids", 4th Edition, 1980/81, Gulf Publishing Company, Houston, cf. in particular Chapter 1 "Introduction to Drilling Fluids" and Chapter 11 "Drilling Fluids Components".

Despite the presence of all auxiliaries known per se, the characteristic of all auxiliary liquids and, in particular, drilling fluids in the context of the teaching according to invention remains: through the correct choice and coordination of the emulsifiers/emulsifier systems as to type and quantity, more particularly with the characteristics of the oil phase used, the w/o invert phase is formed above the middle emulsion phase on contact with the interior of the rock and the high working temperatures prevailing there, at least at the contact surface between hot rock and emulsion. Outside the working zone within the rock, the temperature is reduced, the behavior of those parts of the drilling fluid present there either as a whole or individually again being controllable in various ways through the choice and coordination of the parameters mentioned above. Finally, the objective pursued by the invention, as formulated at the beginning, can be achieved in a hitherto unknown manner.

The following Examples are intended to illustrate specific embodiments of the teaching according to the invention without limiting it in any way.

EXAMPLES

Examples 1 to 7 below contain general formulations which are characterized by the basic system of oil phase and water or aqueous phase and emulsifier or emulsifier system. Whereas the formulation of Example 1 is confined to these basic components, standard additives for drilling muds are used in Examples 2 to 7.

In the Tables summarizing these Examples, the values determined for the phase inversion temperature range (PIT/°C.) are assigned to the particular system. The PIT range is characterized by its lower and upper temperature limits.

The phase inversion temperature is experimentally determined by measurement of the electrical conductivity of the aqueous emulsions as a function of temperature. Particulars of the test procedure can be found in the general descriptions of EP 0 345 586 and EP 0 521 981.

In the formulations of these Examples, some of the components used are identified by their commercial names:

| | |
|---|---|
| Oil phases | |
| Cetiol OE | ether oil based on di-n-octyl ether |
| OMC 586 | oil phase based on an ester mixture of substantially saturated fatty acids based on palm oil and 2-ethyl hexanol which, for by far the most part, goes back to $C_{12/14}$ fatty acids |
| Mineralöl Ha-359 | low-aromatic mineral oil fraction for invert drilling fluids |
| Emulsifiers | |
| Dehydol LT 5 | $C_{12-18}$ fatty alcohol - 5 EO |
| CETIOL HE | polyol fatty acid ester based on polyoxyethylene glycerol monococoate |
| DEHYMULS SML | sorbitan monolaurate |
| Eumulgin EP4 | oleyl alcohol - 4 EO |
| Lutensol T05 and T07 | isotridecyl alcohol - 5 EO and - 7 EO |
| Dehydol 980 | $C_{10-14}$ fatty alcohol - 1.6 PO - 6.4 EO |
| RS 1100 | soya polyol 85 - 61 EO |
| Ez-Mul NTE | w/o invert emulsifier, a product of BAROID, Aberdeen |
| Auxiliaries | |
| Geltone II | organophilic bentonite |
| Duratone | organophilic lignite |
| Tylose VHR and CMC E HVT | cold-water-soluble polymer compounds based on carboxymethyl cellulose |
| Natrosol Plus | cold-water-soluble polymer compound based on hydroxyethyl cellulose (HEC) |

The additives additionally listed in the Tables are self-evident from their chemical identification.

Example 1

Mixtures of the ether-based oil phase and water or a 5% by weight aqueous solution of $CaCl_2$ are homogenized in equal quantities in the usual way using a nonionic emulsifier. The electrical conductivity of the emulsions is then measured as a function of temperature and the phase inversion temperature range is thus determined. The following numerical data apply in this regard:

| | (a) | (b) |
|---|---|---|
| Cetiol OE | 45.0 | 45.0 |
| Dehydol LT 5 | 10.0 | 10.0 |
| Water, dist. | 45.0 | |
| Aqueous $CaCl_2$ solution (5%) | | 45.0 |
| PIT/° C. | 69–81 | 59–68 |

Example 2

The dependence of the PIT range of basically comparable, but modified systems is determined in three comparison tests.

In all three tests, the ether oil phase and the emulsifier correspond to the compounds of Example 1. Now, however, auxiliaries typically used in weighted drilling muds are mixed in as additives together with the oil phase and emulsifier. The differences between the three tests of this Example are as follows:

Example 2a

Equal quantities by weight of oil phase and aqueous phase (5% $CaCl_2$).

Example 2b

The percentage of oil phase is greatly reduced in relation to the aqueous phase (12 parts by weight to 41 parts by weight of aqueous phase). In addition, in Examples 2a and 2b, a cold-water-soluble polymer compound is used to thicken the aqueous phase, even at low temperatures.

Example 2c

The basic formulation of Example 2b is retained, but with the following modifications: the salt content of the aqueous phase is increased from 5% by weight $CaCl_2$ to 30% by weight $CaCl_2$. The formulation does not contain a cold-water-soluble thickener.

The phase inversion temperature range (PIT/°C.) of all the mixtures is determined. In addition, the viscosity of the mixtures is determined first at a temperature well below the PIT range (viscosity at 25° C.) and second at a temperature well above the PIT range (viscosity at 70° C.).

| | (a) | (b) | (c) |
|---|---|---|---|
| Cetiol OE | 25.07 | 12.0 | 12.0 |
| Dehydol LT 5 | 5.57 | 2.67 | 2.67 |
| Bentonite | 0.20 | 0.20 | 0.20 |
| Geltone II | 0.40 | 0.40 | 0.40 |
| Duratone | 0.60 | 0.60 | 0.60 |
| Tylose VHR | 0.10 | 0.10 | |
| Natrosol Plus GR 331 CS | | | 0.20 |
| Barite | 43.0 | 43.0 | 43.0 |
| Aqueous $CaCl_2$ (5%) | 25.07 | 41.03 | |
| Aqueous $CaCl_2$ (30%) | | | 40.93 |
| PIT/° C. | 55–65 | 54–61 | 47–49 |
| Viscos. (100/s)/mpas at 25° C. | 120 | 7 | 380 |
| Viscos. (100/s)/mpas at 70° C. | 40 | 140 | 60 |
| Stability | Sediments slowly | Sediments quickly | Sediments slowly |

The distinct reduction in the PIT range by increasing the salt concentration of the aqueous phase (Example 2c against Example 2b) is evident in this case, too. The lower viscosity of the multicomponent mixture in the water-based o/w emulsion phase at temperatures below the PIT (Example 2b) is arrested by using the small quantity of HEC-based polymeric thickener.

Example 3

Examples 3a and 3b modify the oil phase of the particular multicomponent mixture. The ester oil OMC 586 is now used. In accordance with the basic formulations of Example 2, the oil phase and the water phase are used in equal quantities (Example 3a) and the o/w ratio is again drastically reduced (Example 3b). The phase inversion temperature range is determined for both mixtures.

|  | (a) | (b) |
| --- | --- | --- |
| OMC 586 | 25.07 | 12.0 |
| Dehydol LT 5 | 5.57 | 2.67 |
| Bentonite | 0.20 | 0.20 |
| Geltone II | 0.40 | 0.40 |
| Barite | 43.0 | 43.0 |
| Duratone | 0.60 | 0.60 |
| CMC E HVT | 0.10 | 0.20 |
| Aqueous CaCl$_2$ (30%) | 25.07 | 40.93 |
| PIT/° C. | 50–53 | 49–52 |
| Stability | Sediments slowly | Sediments quickly |

Example 4

A drilling fluid based on ester oil is made up using the formulation of Example 3b and the phase inversion temperature range is determined. In the following Table, the two values measured are shown separately as PIT/°C. "upwards" for rising temperatures and as PIT/°C. "downwards" for falling temperatures.

Further samples of this multicomponent mixture are then conventionally aged by treatment for 16 hours in a roller oven. One sample (Example 4b) is aged at a temperature of 250° F. while another sample (Example 4c) is aged at a temperature of 300° F.

The respective phase inversion temperature ranges ("upwards" and "downwards") of the aged samples are then determined. The following Table shows that, although ageing has a certain effect on the PIT range, the differences remain within acceptable limits from the point of view of practical application.

|  | (a) Fresh | (b) Aged for 16 h at 250° F. | (c) Aged for 16 h at 300° F. |
| --- | --- | --- | --- |
| OMC 586 | 12.0 | 12.0 | 12.0 |
| Dehydol LT 5 | 2.7 | 2.7 | 2.7 |
| Bentonite | 0.2 | 0.2 | 0.2 |
| Geltone II | 0.4 | 0.4 | 0.4 |
| Duratone | 0.6 | 0.6 | 0.6 |
| Natrosol Plus GR 330 CS | 0.2 | 0.2 | 0.2 |
| Barite | 43.0 | 43.0 | 43.0 |
| Aqueous CaCl$_2$ (30%) | 40.9 | 40.9 | 40.9 |
| PIT/° C. (upwards) | 47–49 | 28–34 | 32–35 |
| PIT/° C. (downwards) | 44–47 | 21–22 | 23–34 |

Example 5

In the following two mixtures, the oil phase is again changed and is now a linear α-olefin "LAO (C$_{14/16}$)" which is commercially available and which is used in practice as an oil phase for w/o invert drilling fluids.

In the same way as in Example 3, two drilling fluids containing on the one hand the oil phase and water phase in a ratio of 1:1 (Example 5a) and, on the other hand, the oil phase in a drastically reduced quantity are compared with one another for the same emulsifier. The phase inversion temperature ranges determined—PIT/°C. ("upwards") and PIT/°C. ("downwards")—are associated with the particular formulations in the following Table.

|  | (a) | (b) |
| --- | --- | --- |
| LAO C$_{14/16}$ | 25.1 | 17.0 |
| DEHYDOL LT5 | 5.6 | 3.8 |
| Bentonite | 0.2 | 0.2 |
| Geltone II | 0.4 | 0.4 |
| Duratone | 0.6 | 0.6 |
| Tylose VHR | 0.1 | 0.1 |
| Barite | 43.0 | 43.0 |
| Aqueous CaCl$_2$ (30%) | 25.0 | 35.0 |
| PIT/° C. (upwards) | 39–44 | 23–45 |
| PIT/° C. (downwards) | 39–43 | 38–42 |

Example 6

In the following mixtures, the emulsifier system is changed but the oil phase of Example 5 is retained. An emulsifier combination of a comparatively hydrophilic polyol fatty acid ester Cetiol HE with a relatively hydrophobic co-emulsifier (Dehymuls SML) is used in this Example.

Example 6a and 6b use ratios of oil phase to aqueous salt phase of 1:1 and otherwise identical quantities of additives, but vary the ratio in which the two components of the emulsifier combination are mixed. Comparison of the phase inversion temperature range is determined—PIT/°C. ("upwards") and PIT/°C. ("downwards")—shows that the PIT ranges can be distinctly increased by varying the quantity ratios between the emulsifier components. The PIT range(s) can thus be optimally adapted to meet the required standards.

As in the previous Examples, the formulation of Example 6c again varies the oil-to-water ratio towards a comparatively low-oil mixture although in this case, too, the w/o inversion range required in practice is guaranteed not only in the hot well, but also in comparatively cooler external sections of the drilling fluid circuit.

|  | (a) | (b) | (c) |
| --- | --- | --- | --- |
| LAO C$_{14/16}$ | 25.1 | 25.1 | 17.0 |
| Cetiol HE | 3.0 | 4.0 | 2.71 |
| Dehymuls SML | 2.6 | 1.6 | 1.08 |
| Bentonite | 0.2 | 0.2 | 0.2 |
| Geltone II | 0.4 | 0.4 | 0.4 |
| Duratone | 0.6 | 0.6 | 0.6 |
| Barite | 43.0 | 43.0 | 43.0 |
| Aqueous CaCl$_2$ (30%) | 25.1 | 25.1 | 35.01 |
| PIT/° C. (upwards) | 13–18 | 20–30 | 15–27 |
| PIT/° C. (downwards) | 7–9 | 20–26 | 18–22 |

Example 7

Using the emulsifier mixture of Example 6 and an oil phase based on the ester oil OMC 586, two drilling fluid systems are quantitatively adapted to one another in such a way that the phase inversion temperature of both is in the range from about 20 to 30° C.

One drilling fluid contains equal quantities of oil phase and aqueous 30% by weight calcium chloride solution (Example 7a) whereas, in the second drilling fluid, the ratio by weight of water phase to oil phase is about 2:1.

The compositions of the respective drilling fluids and the phase inversion temperature range determined—PIT/°C. ("upwards") and PIT/°C. ("downwards")—are set out in the following Table.

|  | (a) | (b) |
|---|---|---|
| OMC 586 | 25.1 | 17.0 |
| Cetiol HE | 2.6 | 1.75 |
| Dehymuls SML | 3.0 | 2.05 |
| Bentonite | 0.2 | 0.2 |
| Geltone II | 0.4 | 0.4 |
| Duratone | 0.6 | 0.6 |
| Barite | 43.0 | 43.0 |
| Aqueous CaCl$_2$ (30%) | 25.1 | 35.0 |
| PIT/° C. (upwards) | 26–30 | 21–25 |
| PIT/° C. (downwards) | 19–21 | 18–19 |
| Stability | Sediments slowly | Sediments very slowly |

Example 8

Various drilling fluids based on known oil phases for w/o invert drilling fluids are formulated using the comparatively low-oil multicomponent mixture of Example 7b with its phase inversion temperature range of about 20 to 25° C. The viscosity data of the material are determined as follows before and after ageing:

Viscosity is measured at 50° C. in a Fann-35 viscosimeter of Baroid Drilling Fluids INC. The plastic viscosity (PV), the yield point (YP) and the gel strength (lb/100 ft$^2$) after 10 secs. and 10 mins. are determined in known manner.

The drilling fluid based on the standard formulation of Example 7b is aged by treatment in a roller oven for 16 h at 250° F.

The oil phases used in the particular formulation are identified in the following and the characteristic data as determined before and after ageing are set out in the following Table.

The multicomponent mixtures tested correspond to the following formulation:

| Oil phase | 76.5 g |
|---|---|
| Cetiol HE | 7.9 g |
| Dehymuls SML | 9.2 g |
| CalC$_2$ solution (30%) | 157.5 g |
| Bentonite | 0.9 g |
| Geltone II | 1.8 g |
| Duratone HT | 2.7 g |
| Barite | 193.5 g |

Example 8a

Rapeseed oil as a triglyceride of natural origin is used as the oil phase. The characteristic data determined before and after ageing of the material are set out in the following Table.

|  | Before Ageing | After Ageing |
|---|---|---|
| Plastic viscosity (PV) mPas | 37 | 45 |
| Yield point (YP) lb/100 ft$^2$ | 15 | 14 |
| Gel strength lb/100 ft$^2$ (10 secs.) | 6 | 8 |
| Gel strength lb/100 ft$^2$ (10 mins.) | 7 | 9 |

Example 8b

The di-n-octyl ether Cetiol OE is used as the oil phase. The characteristic data determined before and after ageing of the material are as follows:

|  | Before Ageing | After Ageing |
|---|---|---|
| Plastic viscosity (PV) mPas | 59 | 51 |
| Yield point (YP) lb/100 ft$^2$ | 24 | 19 |
| Gel strength lb/100 ft$^2$ (10 secs.) | 5 | 5 |
| Gel strength lb/100 ft$^2$ (10 mins.) | 7 | 6 |

Example 8c

Isotridecyl alcohol is used as the continuous oil phase. The values determined for the system are as follows:

|  | Before Ageing | After Ageing |
|---|---|---|
| Plastic viscosity (PV) mPas | 37 | 20 |
| Yield point (YP) lb/100 ft$^2$ | 18 | 8 |
| Gel strength lb/100 ft$^2$ (10 secs.) | 6 | 4 |
| Gel strength lb/100 ft$^2$ (10 mins.) | 6 | 4 |

Example 8d

The oil phase used in this Example is the commercial product XPO7 of Baroid, a free-flowing oil phase based on saturated paraffins.

The values determined are set out in the following Table:

|  | Before Ageing | After Ageing |
|---|---|---|
| Plastic viscosity (PV) mPas | 50 | 42 |
| Yield point (YP) lb/100 ft$^2$ | 15 | 16 |
| Gel strength lb/100 ft$^2$ (10 secs.) | 4 | 5 |
| Gel strength lb/100 ft$^2$ (10 mins.) | 5 | 6 |

Example 8e

In this Example, an α-olefin $C_{14/16}$ (70/30) of the LAO type is used as the oil phase. The characteristic data of the material before and after ageing are as follows:

|  | Before Ageing | After Ageing |
|---|---|---|
| Plastic viscosity (PV) mPas | 50 | 46 |
| Yield point (YP) lb/100 ft$^2$ | 15 | 18 |

| | Before Ageing | After Ageing |
|---|---|---|
| Gel strength lb/100 ft² (10 secs.) | 4 | 5 |
| Gel strength lb/100 ft² (10 mins.) | 5 | 10 |

Example 8f

The ester oil OMC 586 is used as the oil phase in this Example. The characteristic data of the material before and after ageing are as follows:

| | Before Ageing | After Ageing |
|---|---|---|
| Plastic viscosity (PV) mPas | 66 | 67 |
| Yield point (YP) lb/100 ft² | 25 | 25 |
| Gel strength lb/100 ft² (10 secs.) | 5 | 6 |
| Gel strength lb/100 ft² (10 mins.) | 6 | 6 |

Example 9

Under the headings Examples 9a, 9b and 9c, the following Table sets out formulations for drilling emulsions in which the oil phase is formed by the ester oil OMC 586 together with a 30% aqueous solution of $CaCl_2$. The particular emulsifier mixtures used of the principal emulsifier component and the co-emulsifier together with the other typical ingredients of the drilling emulsions are set out in the following Table where they are assigned to Examples 9a to 9c. Finally, the PIT ranges of the various multicomponent mixtures are shown in the Table.

| Examples | 9a | 9b | 9c |
|---|---|---|---|
| OMC 586 | 26.50 | 25.10 | 17.00 |
| Eumulgin EP 4 | 3.90 | | |
| RS 1100 | | 2.60 | 1.75 |
| Dehymuls SML | 2.02 | 3.00 | 2.05 |
| Bentonite | 0.23 | 0.20 | 0.20 |
| Geltone II | 0.64 | 0.40 | 0.40 |
| Duratone HT | 1.03 | 0.60 | 0.60 |
| Barite | 36.18 | 43.0 | 43.0 |
| Ca(OH)₂ | 0.08 | | |
| CaCl₂ solution (30%) | 29.42 | 25.10 | 35.00 |
| PIT/° C. (upwards) | 27–36 | 22–30 | 22–26 |
| PIT/° C. (downwards) | | 19–26 | 18–19 |

Example 10

The mixtures of this Example—10a to 10g—all use a commercial w/o invert emulsifier (Ez-Mul NTE, a product of Baroid, Aberdeen) as co-emulsifier. This w/o invert emulsifier is widely used in invert drilling fluids.

The co-emulsifier is combined with various principal emulsifier components corresponding to the definition according to the invention. The following oil phases are used—in each case together with 30% by weight aqueous calcium chloride solution:

Example 10a

Mineralöl Ha-359.

Examples 10b to 10e

Esteröl OMC 586.

Examples 10f and 10g

Linear α-olefin (LAO $C_{14/16}$ (70/30)).

Typical ingredients of drilling emulsions as listed in the following Table (type and quantity) are mixed into together with these components. The phase inversion temperature ranges determined (PIT/°C.) are also shown in the Table.

| Examples | 10a | 10b | 10c | 10d | 10e | 10f | 10g |
|---|---|---|---|---|---|---|---|
| OMC 586 | | 26.50 | 26.50 | 22.69 | 25.60 | | |
| Mineralöl Ha-359 | 26.50 | | | | | | |
| LAO $C_{14/16}$ (70/30) | | | | | | 25.10 | 17.00 |
| Lutensol T07 | 4.20 | | | | 3.30 | 3.50 | 2.37 |
| $C_{10-18}$.9EO carbonate | | 4.92 | | | | | |
| Dehydol 980 | | | 2.80 | | | | |
| $C_{12}$ Guerbet alcohol.6EO | | | | 5.83 | | | |
| Ez-Mul NTE as co-emulsifier | 1.72 | 1.00 | 3.12 | 3.90 | 2.62 | 2.10 | 1.43 |
| Bentonite | 0.23 | 0.23 | 0.23 | 0.23 | 0.23 | 0.20 | 0.20 |
| Geltone II | 0.64 | 0.64 | 0.64 | 0.64 | 0.64 | 0.40 | 0.40 |
| Duratone HT | 1.03 | 1.03 | 1.03 | 1.03 | 1.03 | 0.60 | 0.60 |
| Barite | 36.18 | 36.18 | 36.18 | 36.18 | 36.18 | 43.00 | 43.00 |
| Ca(OH)₂ | 0.08 | 0.08 | 0.08 | 0.08 | 0.08 | | |
| CaCl₂ solution (30%) | 29.42 | 29.42 | 29.42 | 29.42 | 29.42 | 25.10 | 35.00 |
| PIT/° C. (upwards) | 14–24 | 35–41 | 24–32 | 30–34 | 23–28 | 22–29 | 33–38 |
| PIT/° C. (downwards) | | | | | | 21–29 | 23–24 |

Example 11

In five test mixtures using the ester oil phase OMC 586 and a 30% by weight aqueous calcium chloride solution as liquid phase, the particular oil-to-water ratios (% by volume) used are varied as follows: 40:60, 50:50, 60:40, 70:30, 80:20.

In every case, a mixture of Lutensol T05 as principal emulsifier component and EZ-Mul NTE as co-emulsifier is used as the emulsifier system.

The quantities in which the five mixtures tested are present in the test formulation are set out in the following Table. The plastic viscosity (PV in mPas), yield point (YP in lb/100 ft²) and gel strength (gel 10"/10' in lb/100 ft²) of these multicomponent mixtures are then determined before ageing (BHR) and after ageing (AHR). The various drilling fluids are conventionally aged for 16 hours at 250° F. in a roller oven. The viscosity data are also conventionally determined, cf. Example 8.

The composition by weight (in g) of the tested emulsion can be found in the following Table. As in Example 8, the drilling emulsion is aged for 16 hours at 250° F. and is then tested at 50° C. to determine its key rheological data in the same way as described in Example 8. The values determined Table for Example 11

|  | A |  | B |  | C |  | D |  | E |  |
|---|---|---|---|---|---|---|---|---|---|---|
| OMC 586 (g) | 68.5 |  | 85.6 |  | 102.6 |  | 119.8 |  | 136.9 |  |
| Lutensol TO5 (g) | 8.53 |  | 10.65 |  | 12.77 |  | 14.91 |  | 17.04 |  |
| Ez-Mul NTE (g) | 6.76 |  | 8.45 |  | 10.13 |  | 11.83 |  | 13.52 |  |
| $CaCl_2$ solution (30%) (g) | 170.6 |  | 142.2 |  | 113.9 |  | 85.29 |  | 56.86 |  |
| Bentonite (g) | 0.9 |  | 0.9 |  | 0.9 |  | 0.9 |  | 0.9 |  |
| Geltone II (g) | 2.5 |  | 2.5 |  | 2.5 |  | 2.5 |  | 2.5 |  |
| Duratone HT (g) | 4 |  | 4 |  | 4 |  | 4 |  | 4 |  |
| Lime (g) | 0.3 |  | 0.3 |  | 0.3 |  | 0.3 |  | 0.3 |  |
| Barite (g) | 107.8 |  | 123.8 |  | 140.1 |  | 156.7 |  | 169.1 |  |
| O/w ratio % by volume | 40:60 |  | 50:50 |  | 60:40 |  | 70:30 |  | 80:20 |  |
|  | BHR | AHR | BHR | AHR | BHR | AHR | BHR | AHR | BHR | AHR |
| PV (mPas) | 73 | 10 | 69 | 55 | 45 | 44 | 30 | 30 | 20 | 23 |
| YP (lb/100 ft$^2$) | 35 | 3 | 24 | 20 | 10 | 9 | 3 | 6 | 5 | 4 |
| Gel strength 10"/10' (lb/100 ft$^2$) | 6/7 | 3/3 | 5/5 | 4/4 | 3/3 | 4/5 | 3/3 | 3/4 | 2/2 | 3/4 |
| PIT/° C. (upwards) | 30–41 |  | 25–31 |  | 23–26 |  | 23–29 |  | 21–23 |  |
| PIT/° C. (downwards) | 23–25 |  | 23–28 |  | 26–28 |  | 23–30 |  | 22–24 |  |

Example 12

The following Table shows series of tests according to the invention using emulsifier systems which contain APG compounds as part of the principal emulsifier component(s) or as sole principal emulsifier component. The $C_{12-16}$ APG product marketed by applicants as APG 600 is used as the APG component. The products used contain 51% by weight of active substance. In both cases, the co-emulsifier used is again the commercial w/o invert emulsifier Ez-Mul NTE.

The following Table shows the composition of the drilling emulsions in % by weight and the phase inversion temperature ranges (PIT/°C. upwards).

|  | Example 12a | Example 12b | Example 12c | Example 12d |
|---|---|---|---|---|
| OMC 586 | 26.50 | 26.50 | 26.5 | 26.5 |
| Lutensol T05 | 1.65 |  |  |  |
| APG 600 | 1.65 | 3.30 | 5.12 | 5.70 |
| Ez-Mul NTE | 2.62 | 2.62 | 3.30 | 3.00 |
| Bentonite | 0.23 | 0.23 | 0.23 | 0.23 |
| Geltone II | 0.64 | 0.64 | 0.64 | 0.64 |
| Duratone HT | 1.03 | 1.03 | 1.03 | 1.03 |
| Barite | 36.18 | 36.18 | 36.18 | 36.18 |
| Ca(OH)$_2$ | 0.08 | 0.08 | 0.08 | 0.08 |
| CaCl$_2$ solution (30%) | 29.42 | 29.42 | 26.92 | 26.64 |
| PIT/° C. (upwards) | 20–22 | 46–49 | 10.6–14.7 | 22.4–27.5 |
| PIT/° C. (downwards) |  |  | 9.9–14.3 | 22.0–7.0 |
| Stability | Sediments slowly | Sediments slowly |  |  |

Example 13

An invert drilling emulsion using rapeseed oil as a triglyceride of natural origin is investigated in another test. This Example uses a mixture of 1 part by weight of rapeseed oil and slightly more than 4 parts by weight of the ester oil OMC 586 as the oil phase.

before ageing (BHR) and after ageing (AHR) are assigned to the particular drilling fluid in the following Table.

Finally, the PIT ranges determined are assigned to the fresh and aged drilling fluids. The figures shown represent the temperatures at which the conductivity reaches 0 ms/cm.

Table for Example 13

|  | A |  |
|---|---|---|
| OMC 586 (g) | 82.6 |  |
| Rapeseed oil (g) | 20 |  |
| Lutensol T05 (g) | 12.77 |  |
| Ez-Mul NTE (g) | 10.13 |  |
| CaCl$_2$ solution (30%) (g) | 113.9 |  |
| Bentonite (g) | 0.9 |  |
| Geltone II (g) | 2.5 |  |
| Duratone HT (g) | 4 |  |
| Lime (g) | 0.3 |  |
| Barite (g) | 140.1 |  |
|  | BHR | AHR |
| PV (mPas) | 64 | 64 |
| YP (lb/100 ft$^2$) | 38 | 37 |
| Gel strength 10"/10' (lb/100 ft$^2$) | 19/9 | 18/6 |
| PIT/° C. (upwards) | 30 | 32.9 |

What is claimed is:

1. A process of developing a geological resource or treating a drilled well comprising contacting said resource or well with a multicomponent composition comprising an aqueous phase, an oil phase and an emulsifier component, and optionally, soluble, emulsifiable or dispersible auxiliary components, wherein said emulsifier component provides temperature-controlled phase inversion of said composition from an oil-in-water emulsion at a temperature below the phase inversion temperature of said composition to a water-in-oil emulsion at a temperature above the phase inversion temperature of said composition, removing cuttings covered with drilling mud from said resource or well, and washing said cuttings with cold water whereby said composition is converted from a water-in-oil emulsion to an oil-in-water emulsion.

2. A process as in claim 1, wherein the upper limit of the phase inversion temperature of said composition is sufficiently below the working temperature of said composition during development of said resource or treatment of said drilled well that said aqueous phase is present as a dispersed phase and said oil phase is present as the continuous phase, and at the lower limit or the phase inversion temperature of said composition said oil phase is present as a dispersed phase and said aqueous phase is present as the continuous phase.

3. A process as in claim 2 wherein the upper limit of said phase inversion temperature is at least 3° C. to 5° C. below said working temperature.

4. A process as in claim 1 wherein the phase inversion temperature of said composition is above the solidification temperature of said aqueous phase as the lower limit and up to 100° C. as the upper limit.

5. A process as in claim 1 wherein the phase inversion temperature of said composition is from 0° C. to 100° C.

6. A process as in claim 1 wherein said composition is flowable and pumpable at room temperature.

7. A process as in claim 1 wherein said emulsifier component is at least partly nonionic or contains nonionic and anionic groups in its molecular structure.

8. A process as in claim 1 wherein said emulsifier component comprises a multicomponent emulsifier mixture having hydrophilic properties and lipophilic properties.

9. A process as in claim 8 wherein said multicomponent emulsifier mixture contains a principal emulsifier having an HLB value of 6 to 20 and a lipophilic co-emulsifier having a lower HLB value than said principal emulsifier.

10. A process as in claim 1 wherein said emulsifier component is selected from (oligo)alkoxylates of basic molecules of natural or synthetic origin which contain lipophilic groups and which are capable of alkoxylation, the alkoxylates optionally being end-capped; partial esters or partial ethers of polyhydric alcohols containing 2 to 6 carbon atoms and 2 to 6 OH groups or oligomers thereof with acids or alcohols which contain lipophilic groups and optionally contain (oligo)alkoxylate residues; alkyl (poly)glycosides of long-chain alcohols; fatty alcohols of natural or synthetic origin; alkylolamides; amine oxides and lecithins.

11. A process as in claim 1 wherein said emulsifier component is present in an amount of at least 1% by weight, based on the weight of said oil phase.

12. A process as in claim 1 wherein said oil phase is at least predominantly insoluble in said aqueous phase and has a flash point above 60° C.

13. A process as in claim 1 wherein said oil phase has a Brookfield (RVT) viscosity at 0° C. to 10° C. of less than 55 mPas.

14. A process as in claim 1 wherein said oil phase is selected from saturated hydrocarbons, olefinically unsaturated hydrocarbons, aromatic hydrocarbons, naphthenes, carboxylic acid esters of monohydric or polyhydric alcohols, ethers, acetals, carbonic acid esters, fatty alcohols, silicone oils, (oligo)amides, (oligo)imides and (oligo)ketones.

15. A process as in claim 1 wherein said aqueous phase and said oil phase are present in a ratio by volume of 90:10 to 10:90.

16. A process as in claim 1 wherein said aqueous phase is present in an amount of 30% to 35% by volume based on the volume of said aqueous phase and said oil phase.

17. A process as in claim 1 wherein the phase inversion temperature of said composition is between 5° C. to 80° C.

18. A process as in claim 1 wherein at a temperature of 10° C. to 15° C. above the phase inversion temperature of said composition to a water-in-oil emulsion, said composition has a plastic viscosity of not more than 100 mPas and a yield point of not more than 80 lb/100 ft$^2$.

19. A process as in claim 1 wherein said auxiliary components are selected from thickeners, fluid loss additives, weighting agents, water-soluble organic or inorganic additives, alkali reserve agents and biocides.

20. A process as in claim 1 wherein said aqueous phase contains a polymer compound dissolved therein.

* * * * *